US007921710B2

(12) United States Patent
Cinpinski et al.

(10) Patent No.: US 7,921,710 B2
(45) Date of Patent: Apr. 12, 2011

(54) TWO-STEP OIL CONTROL VALVE DIAGNOSTIC SYSTEMS

(75) Inventors: Kenneth J. Cinpinski, Ray, MI (US); Donovan L. Dibble, Utica, MI (US); Joshua Cowgill, Brighton, MI (US)

(73) Assignee: GM Global Technology Operations LLC

( * ) Notice: Subject to any disclaimer, the term of this patent is extended or adjusted under 35 U.S.C. 154(b) by 171 days.

(21) Appl. No.: 12/435,725

(22) Filed: May 5, 2009

(65) Prior Publication Data

US 2010/0281966 A1 Nov. 11, 2010

(51) Int. Cl.
*G01M 15/04* (2006.01)

(52) U.S. Cl. .................................. 73/114.79; 73/114.77

(58) Field of Classification Search ............... 73/114.77, 73/114.79, 115.01

See application file for complete search history.

(56) References Cited

U.S. PATENT DOCUMENTS

| | | | | |
|---|---|---|---|---|
| 5,937,806 | A * | 8/1999 | Lyko et al. | 123/90.15 |
| 7,063,057 | B1 * | 6/2006 | Waters et al. | 123/90.16 |
| 7,077,082 | B2 * | 7/2006 | Bloms et al. | 123/90.12 |
| 7,246,583 | B2 * | 7/2007 | Cinpinski et al. | 123/90.27 |
| 7,698,935 | B2 * | 4/2010 | Dibble et al. | 73/114.79 |
| 7,712,441 | B2 * | 5/2010 | Cinpinski et al. | 123/90.15 |
| 7,827,968 | B2 * | 11/2010 | Cinpinski et al. | 123/508 |
| 2003/0213445 | A1 * | 11/2003 | Bloms et al. | 123/90.12 |
| 2007/0068474 | A1 * | 3/2007 | Cinpinski et al. | 123/90.17 |
| 2009/0132146 | A1 * | 5/2009 | Dibble et al. | 701/102 |
| 2009/0143963 | A1 * | 6/2009 | Hendriksma | 701/114 |
| 2009/0145384 | A1 * | 6/2009 | Cinpinski et al. | 123/90.17 |
| 2009/0222196 | A1 * | 9/2009 | Cinpinski et al. | 701/105 |
| 2010/0154526 | A1 * | 6/2010 | Cinpinski et al. | 73/114.79 |
| 2010/0269575 | A1 * | 10/2010 | Cinpinski et al. | 73/114.41 |

* cited by examiner

*Primary Examiner* — Freddie Kirkland, III

(57) ABSTRACT

A diagnostic system includes a first pressure monitoring module, a second pressure monitoring module, and a fault determination module. The first pressure monitoring module determines low-lift pressures and high-lift pressures in a cam phaser when a first oil control valve (OCV) moves first valve lifters to the low-lift state and the high-lift state, respectively. The second pressure monitoring module determines low-lift pressures and high-lift pressures in the cam phaser when a second OCV moves second valve lifters to the low-lift state and the high-lift state, respectively. The fault determination module diagnoses a fault in one of the first OCV and the second OCV based the low-lift pressures and the high-lift pressures.

19 Claims, 3 Drawing Sheets

TWO-STEP OIL CONTROL VALVE DIAGNOSTIC SYSTEMS

FIELD

The present disclosure relates to valve trains for internal combustion engines, and more particularly to diagnostic systems for oil control valves that controls two-step valve lifters between a low-lift state and a high-lift state.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Vehicles include internal combustion engines that generate drive torque. Intake valves are selectively opened to draw air into cylinders of the engine. The air is mixed with fuel to form a combustion mixture. The combustion mixture is compressed and combusted within the cylinders to drive pistons therein. Exhaust valves are selectively opened to allow the exhaust gas to exit from the cylinders after combustion.

Timing for opening and closing the intake and exhaust valves may be controlled by an intake camshaft and an exhaust camshaft, respectively. The camshafts are synchronized with a crankshaft by a chain or belt and generally include cam lobes that correspond to the plurality of intake and exhaust valves.

Valve lifters are provided between the intake and exhaust valves and the intake and exhaust camshafts for controlling opening and closing of the intake and exhaust valves. The valve lifters for the intake valves may be two-step valve lifters that are selectively operable in a low-lift state and a high-lift state. When engine load is low, the valve lifters are switched to a low-lift state to reduce displacement of the intake valves to reduce engine pumping losses. When engine load is high, the valve lifters are switched to the high-lift state to allow for a greater displacement of the intake valves, resulting in a greater open duration for the intake valves. Additionally, the valve lifters that have different lift profiles may change the duration and timing of the valve event to allow for early intake valve closing (EIVC) or late intake valve closing (LIVC).

SUMMARY

A diagnostic system includes a first pressure monitoring module, a second pressure monitoring module, and a fault determination module. The first pressure monitoring module determines low-lift pressures and high-lift pressures in a cam phaser when a first oil control valve (OCV) moves first valve lifters to a low-lift state and a high-lift state, respectively. The second pressure monitoring module determines low-lift pressures and high-lift pressures in the cam phaser when a second OCV moves second valve lifters to the low-lift state and the high-lift state, respectively. The fault determination module diagnoses a fault in one of the first OCV and the second OCV based the low-lift pressures and the high-lift pressures.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
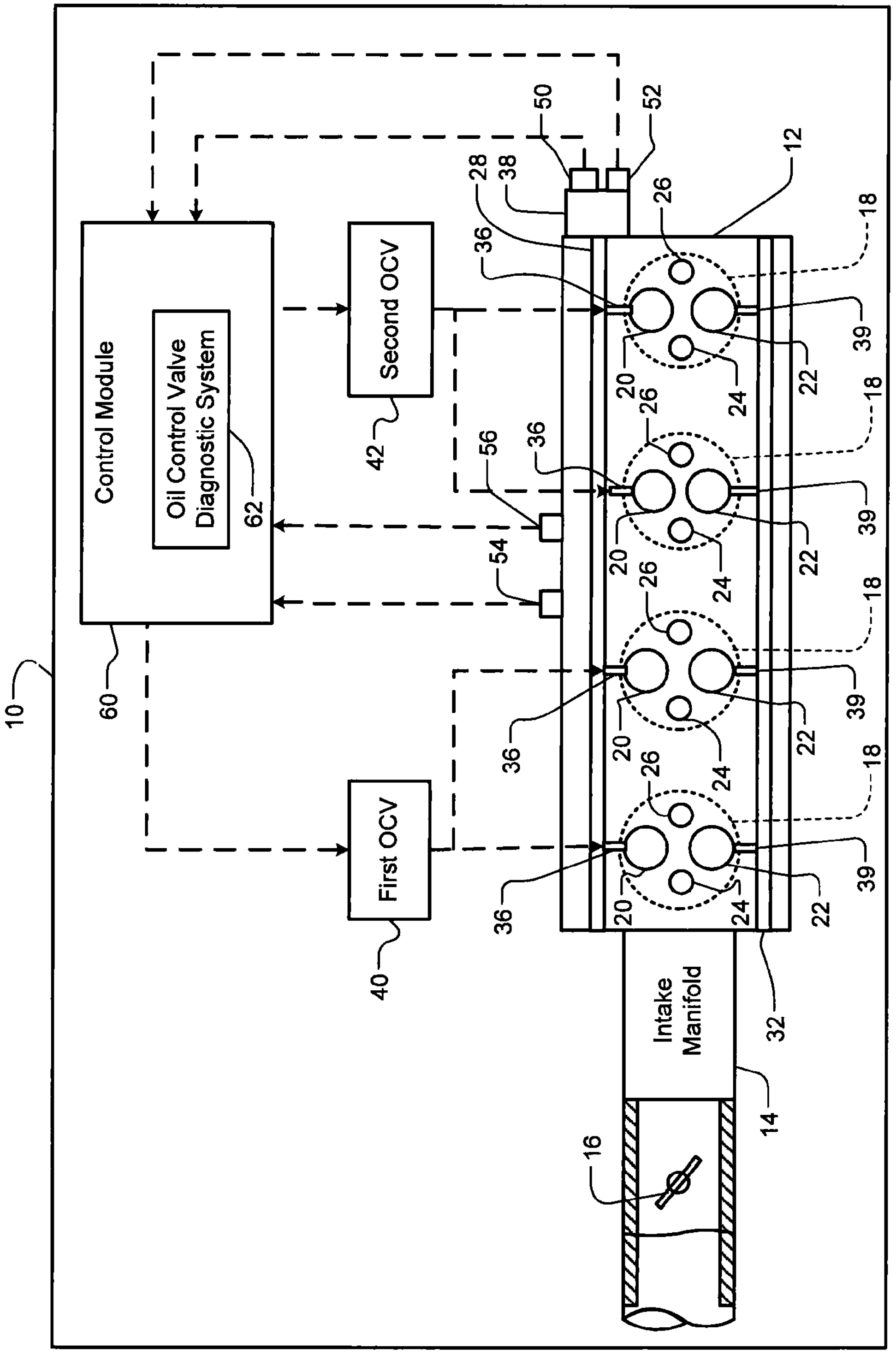
FIG. 1 is a functional block diagram of an engine system that includes an oil control valve diagnostic system in accordance with the teachings of the present disclosure.

The following description is merely exemplary in nature and is not intended to limit the present disclosure, application, or uses. For purposes of clarity, the same reference numbers will be used in the drawings to identify similar elements. As used herein, the term "module" refers to an application specific integrated circuit (ASIC), an electronic circuit, a processor (shared, dedicated, or group) and memory that execute one or more software or firmware programs, a combinational logic circuit, or other suitable components that provide the described functionality.

The oil control valve (OCV) diagnostic system according to the present disclosure determines a plurality of first pressure differences in a cam phaser for a first group of cylinders associated with a first OCV and a plurality of second pressure differences in the cam phaser for a second group of cylinders associated with a second OCV. The first pressure differences are differences between pressures that are measured in the cam phaser when first valve lifters controlled by the first OCV are in a high-lift state and a low-lift state, respectively. The second pressure differences are differences between pressures that are measured in the cam phaser when the second valve lifters controlled by the second OCV are in a high-lift state and a low-lift state, respectively. The OCV diagnostic system determines a first summation of the first pressure differences and a second summation of the second pressure differences. A fault may be diagnosed in one of the first OCV and the second OCV when the difference between the first and the second summation exceeds a threshold.

Referring now to FIG. 1, an engine system 10 includes an engine 12 that combusts an air and fuel mixture to produce drive torque. Air is drawn into an intake manifold 14 through a throttle 16. The throttle 16 regulates mass air flow into the intake manifold 14. Air within the intake manifold 14 is distributed into cylinders 18. Although four cylinders 18 are illustrated, the engine 12 may have any number of cylinders, such as, for example only, 2, 6, 8, 10, or 12 cylinders. The engine 12 may be a straight or V engine.

Each cylinder 18 includes an intake valve 20, an exhaust valve 22, a fuel injector 24, and a spark plug 26. While only one intake valve 20 and exhaust valve 22 are illustrated, it can be appreciated that multiple intake valves 20 and exhaust valves 22 may be provided per cylinder 18.

The fuel injectors 24 inject fuel that is combined with the air as the air is drawn into the cylinders 18 through intake ports. The fuel injectors 24 are controlled to provide a desired air-to-fuel (A/F) ratio within each cylinder 18. The intake valves 20 are selectively opened and closed to enable the air/fuel mixture to enter the cylinders 18. A piston (not shown) compresses the air/fuel mixture within each cylinder 18. The spark plugs 26 initiate combustion of the air/fuel mixture, driving the pistons in the cylinders 18. The pistons drive a crankshaft (not shown) to produce drive torque. Combustion exhaust within the cylinders 18 is forced out exhaust ports when the exhaust valves 22 are opened. The exhaust is treated in an exhaust system (not shown).

Timing for opening and closing the intake valves 20 is controlled by an intake camshaft 28. Timing for opening and closing the exhaust valves 22 is controlled by an exhaust camshaft 32. While not shown in the drawings, it is understood and appreciated that a single camshaft may be used to control timing for both the intake and exhaust valves 20 and 22.

The intake camshaft 28 and the exhaust camshaft 32 are synchronized to a crankshaft (not shown) by a chain or belt. The intake and exhaust camshafts 28 and 32 generally include cam lobes (not shown) that operate the plurality of intake and exhaust valves 20 and 22. The cam lobes may be designed to have a first profile for a low lift and a second profile for a high lift. The intake valves 20 and the exhaust valves 22 are opened and closed as the intake and exhaust camshafts 28 and 32 rotate.

An intake cam phaser 38 is attached to the intake camshaft 28 and regulate the timing of the intake camshaft 28. The timing or phase angle of the intake camshaft 28 can be retarded or advanced with respect to a location of the piston within the cylinder 18 or with respect to crankshaft position. As the intake cam phaser 38 rotates, the intake camshaft 28 is rotated around a cam axis to change the position of the intake camshaft 28 relative to the position of the pistons or the crankshaft position. Therefore, the quantity of air/fuel mixture ingested into the cylinder 18, and therefore the engine torque, is regulated.

The intake valves 20 are connected to the intake camshaft 28 by a plurality of valve lifters such as switching roller finger follower (SRFF) mechanisms 36. The cam lobes on the intake camshaft 28 are in operative contact with the SRFF mechanisms 36. Typically, distinct SRFF mechanisms 36 operate on each of the intake valves 20 of each cylinder 18. In the exemplary embodiment, each cylinder 18 includes one SRFF mechanism 36. The SRFF mechanisms 36 lift the intake valves 20 as the intake camshaft 28 rotates. The SRFF mechanisms 36 enable two discrete valve states (e.g. a low lift state or a high lift state) on the intake valves 20.

The exhaust valves 22 are connected to the exhaust camshaft 32 by valve lifters 39. The valve lifters 39 may or may not be SRFF mechanisms that are switchable between a low-lift state and a high-lift state.

More specifically, the intake camshaft 28 may include a low-lift cam lobe and a high-lift cam lobe for each valve. During a low-lift state, the SRFF mechanisms 36 are in operative contact with the low-lift cam lobes that cause the SRFF mechanisms 36 to move to a first position in accordance with the prescribed geometry of the low-lift cam lobes and thereby open the intake valve 20 a first predetermined amount. During a high-lift state, the SRFF mechanisms 36 are in operative contact with the high-lift cam lobes that cause the SRFF mechanisms 36 to move to a second position in accordance with the prescribed geometry of the high-lift cam lobes and thereby open the intake valves 20 a second predetermined amount greater than the first predetermined amount.

The SRFF mechanisms 36 may be transitioned from a low-lift state to a high-lift state and vice versa based on demanded engine speed and load. For example, an engine operating at an elevated engine speed such as 4,000 revolutions per minute (RPMs) typically requires the SRFF mechanisms 36 to operate in a high-lift state to avoid potential hardware damage to the engine 12.

First and second oil control valves (OCVs) 40 and 42 are used to move the SRFF mechanisms 36 between the low-lift state and the high-lift state. The first OCV 40 communicates with the SRFF mechanisms 36 associated with a first group of cylinders 18 (for example, cylinders #1 and #2). The second OCV 42 communicates with the SRFF mechanisms 36 associated with a second group of cylinders 18 (for example, cylinders #3 and #4). The first OCV 40 and the second OCV 42 are in fluid communication with the associated SRFF mechanism 36 through oil galleries in the cylinder heads. The first OCV 40 and the second OCV 42 control the lift states of the SRFF mechanisms 36 by regulating oil pressure supplied to the SRFF mechanisms 36. When a control module 60 commands a high-lift state, the first and second OCVs 40 and 42 supply pressurized oil to activate the SRFF mechanisms 36, causing the SRFF mechanisms 36 to operate in the high-lift state. When a control module 60 commands a low-lift state, the first and second OCVs 40 and 42 restrict engine oil flow to the SRFF mechanisms 36. The restricted engine oil flow is sufficient for lubricating the valve galley, but does not have sufficient flow or pressure to activate the SRFF mechanisms 36.

The intake cam phaser 38 includes a position sensor 50 and a pressure sensor 52. The position sensor 50 senses a rotational position of the intake cam phaser 38 and generates a signal indicative of the rotational position of the intake cam phaser 38. The pressure sensor 52 measures the oil pressure in the intake cam phaser 38. An engine speed sensor 54 is provided at the engine 12 and measures an engine speed. Other sensors 56 (including but not limited to, oxygen sensors, engine coolant temperature sensors, and/or mass airflow sensors) are also provided at the engine 12 to monitor the engine operating conditions.

The control module 60 includes a processor and memory such as random access memory (RAM), read-only memory (ROM), and/or other suitable electronic storage. The control module 60 includes an OCV diagnostic system 62 that diagnoses the first OCV 40 and the second OCV 42 during engine operation.

Figure 2:
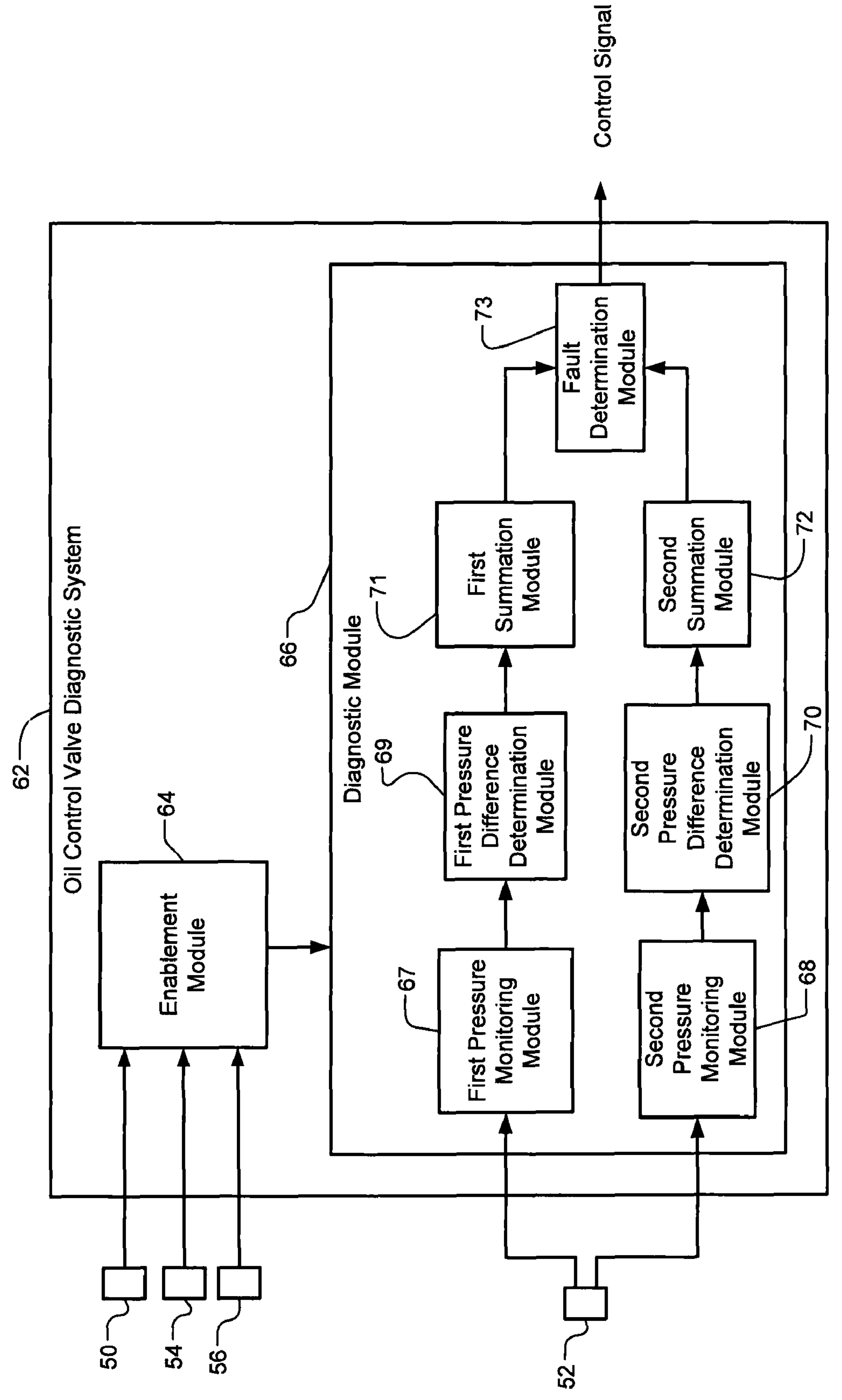
FIG. 2 is a functional block diagram of an oil control valve diagnostic system in accordance with the teachings of the present disclosure.
Figure 3:
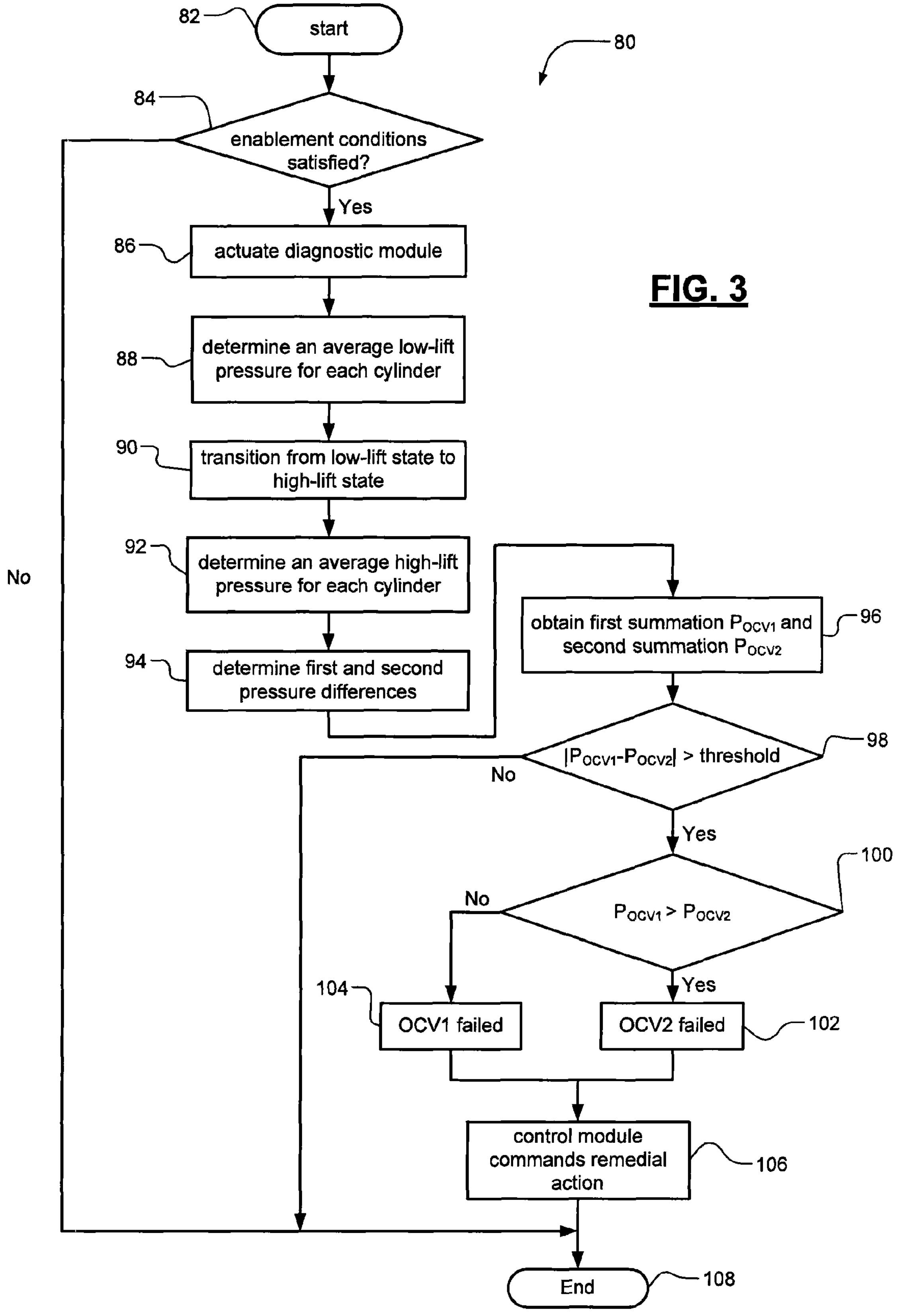
FIG. 3 is a flow diagram illustrating a method of diagnosing an oil control valve in accordance with the teachings of the present disclosure.

Referring now to FIG. 2, the exemplary OCV diagnostic system 62 according to the present disclosure includes an enablement module 64 and a diagnostic module 66. The enablement module 64 activates the diagnostic module 66 when an enablement condition is present. The diagnostic module 66 includes a first pressure monitoring module 67, a second pressure monitoring module 68, a first pressure difference determination module 69, a second pressure difference determination module 70, a first summation module 71, a second summation module 72, and a fault determination module 73.

The enablement module 64 communicates with the diagnostic module 66, the cam phaser position sensor 50, the engine speed sensor 54 and other sensors 56 to evaluate engine operating conditions. The enablement module 64 determines whether to enable the diagnostic module 66 by verifying whether various enablement conditions are met. The enablement conditions may be present when the engine speed is below a threshold (e.g. 2000 RPM) and when the intake cam phaser 38 operates in a steady-state position. In other words, the enablement module 64 verifies that the engine 12 is operating in a "normal" or low lift state. Those skilled in the art will appreciate that other enablement conditions are contemplated. The enablement module 64 may be set to determine the enablement conditions at a regular interval.

When the enablement conditions are present, the enablement module 64 activates the diagnostic module 66. The first pressure monitoring module 67 and the second pressure monitoring module 68 start to record the oil pressure in the intake cam phaser 38 when the first group of cylinders 18 and the second group of cylinders 18 are operating under similar conditions. The first pressure monitoring module 67 records the oil pressure in the intake cam phaser 38 during a low-lift state (i.e., the "low-lift pressure") for each cylinder 18 in the first group of cylinders over a predetermined number (e.g. 8) of engine revolutions when the first OCV 40 restricts engine oil flow to the SRFF mechanisms 36. The first pressure monitoring module 67 then averages the pressures that are obtained during the predetermined number of engine revolutions to obtain an average low-lift pressure for each cylinder in the first group.

Similarly, the second pressure monitoring module 68 records and averages the oil pressure in the intake cam phaser 38 during a low-lift state (i.e., the "low-lift pressure") for each cylinder 18 in the second group of cylinders over a predetermined number (e.g. 8) of engine revolutions when the second OCV 42 restricts oil flow to the SRFF mechanisms 36.

After the low-lift pressures for all cylinders 18 are acquired, averaged, and recorded, the control module 60 commands the SRFF mechanisms 36 to a high-lift state. The first OCV 40 supplies pressurized oil to the SRFF mechanisms 36 associated with the first group of cylinders 18. The second OCV 42 supplies pressurized oil to the SRFF mechanisms 36 associated with the second group of cylinders 18. With the pressurized oil, the SRFF mechanisms 36 are activated and transitioned to a high-lift state.

After the SRFF mechanisms 36 are transitioned from a low-lift state to a high-lift state, the first pressure monitoring module 67 waits for a calibrated wait period (e.g. 4 revolutions of the engine 12) to record the pressure in the intake cam phaser 38 measured by the pressure sensor 52. The calibrated wait period ensures the engine 12 has properly transitioned to the high-lift state. Thereafter, the first pressure monitoring module 67 starts to record the oil pressure (i.e., the high-lift pressure) in the intake cam phaser 38 for a predetermined number (e.g., 8) of engine revolutions for each cylinder 18 associated with the first OCV 40. The first pressure monitoring module 67 then averages the pressures that are obtained during the predetermined number of engine revolutions to obtain an average high-lift pressure for each cylinder in the first group. Similarly, the second pressure monitoring module 68 also records and averages the oil pressure in the intake cam phaser 38 during a high-lift state (i.e., the "high-lift pressures") for each cylinder in the second group of cylinders.

The oil pressure in the intake cam phaser 38 changes as the valve-lift state changes. When the intake valves 20 are in a low-lift state, less work is required to open the intake valves 20, resulting in lower amplitude of pressure pulse within the intake cam phaser 38. When the intake valves 20 are in a high-lift state, the oil pressure in the intake cam phaser 38 is higher. The first and second pressure monitoring modules 67 and 68 capture the measured pressure peaks for both the low-lift state and the high-lift state. The captured data for each cylinder 18 are averaged and retained in memory. Signals corresponding to the average high-lift pressure and the average low-lift pressure for each cylinder are sent to the first and second pressure difference determination modules 69 and 70, respectively, for further processing.

The first pressure difference determination module 69 calculates a plurality of first pressure differences between the average low-lift pressures and the average high-lift pressures for the first group of cylinders 18. The second pressure difference determination module 70 calculates a plurality of second pressure differences between the average low-lift pressures and the average high-lift pressures for the second group of cylinders 18.

The first summation module 71 sums the plurality of first pressure differences for the first group of cylinders 18 to obtain a first summation $P_{OCV1}$. The second summation module 72 sums the plurality of second pressure differences for the second group of cylinders 18 to obtain a second summation $P_{OCV2}$. The first and second summation modules 71 and 72 then send signals indicative of the first summation $P_{OCV1}$ and the second summation $P_{OCV2}$ to the fault determination module 72.

Because the first and second groups of cylinders 18 are operated under similar operating conditions, the average low-lift and high-lift pressures, their differences and their summations $P_{OCV1}$ and $P_{OCV2}$ for each group should be similar and within an acceptable range.

When one of the OCVs 40 and 42 does not function properly, the pressure differences for all cylinders in the same group associated with the failed OCV will deviate from normal values. The pressure differences associated with a properly functioning OCV represent normal values. Summation of the pressure differences will accentuate the deviations.

When the difference between the first summation $P_{OCV1}$ and the second summation $P_{OCV2}$ exceeds a threshold, the fault determination module 72 diagnoses a fault in one of the first and second OCVs 40 and 42. The fault determination module 72 diagnoses a fault in the first OCV 40 if the first summation is smaller than the second summation. The fault determination module 72 diagnoses a fault in the second OCV 42 if the second summation $P_{OCV2}$ is smaller than the first summation $P_{OCV1}$. The diagnostic module 62 generates and transmits a fault signal identifying the failed OCV to the control module 60. The control module 60 may command remedial action by reducing engine speeds to prevent damage to the engine 12.

Alternatively, the fault determination module 72 may diagnose a fault in the first OCV 40 (or the second OCV 42) when the summation associated with the OCV 40 or 42 is below a second threshold or is approximately zero. When an OCV is faulty, the OCV may be incapable of providing varied oil pressures for the low-lift state and for the high-lift state, resulting in a pressure difference below a second threshold, or in the vicinity of zero. Therefore, the fault determination module 72 may diagnose a fault in the first OCV 40 (or the second OCV 42) when the first summation (or the second summation) is below a second threshold or is approximately zero.

Summation of the pressure differences may distinguish a condition of a failed OCV from a condition of a failed SRFF mechanism 36. When an SRFF mechanism 36 fails, the SRFF mechanism 36 may not transition from a low-lift state to a high-lift state or vice versa. When an SRFF mechanism 36 fails, the first or second pressure difference determination module 69 or 70 may obtain a pressure difference of approximately zero for a cylinder with the failed SRFF mechanism 36. Because the pressure differences for all cylinders 18 in the same group are summed, the zero pressure difference that results from the failed SRFF mechanism 36 does not make the summation of the pressure differences deviate from the acceptable range. Therefore, when a difference between the first summation $P_{OCV1}$ and the second summation $P_{OCV2}$ exceeds a threshold, it can be determined that a failed OCV 40 or 42, not a failed SRFF mechanism 36, results in the deviation.

Referring now to FIG. 4, a method 80 of diagnosing OCVs starts in step 82. The enablement module 64 determines whether the enablement conditions have been satisfied in step 84. If the enablement conditions have been satisfied, the diagnostic module 66 is actuated in step 86. In step 88, the first pressure monitoring module 67 records low-lift pressures and determines an average low-lift pressure for each cylinder 18 in the first group of cylinders and the second pressure monitoring module 68 records low-lift pressures and determines an average low-lift pressure for each cylinder 18 in the second group of cylinders. The control module 60 then commands the valve lifter mechanisms to transition from the low-lift state to a high-lift state in step 90. The first pressure monitoring module 67 records the high-lift pressures and determines an average high-lift pressure for each cylinder in the first group in step 92. Similarly, the second pressure monitoring module 68 records the high-lift pressures and determines an average high-lift pressure for each cylinder in the second group in step 92. The first pressure difference determination module 69 determines first pressure differences for the first group of cylinders and the second pressure difference determination module 70 determines second pressure differences for the second group of cylinders in step 94. The first summation module 71 sums the pressure differences for the first group of cylinders to obtain a first summation and the second summation module 72 sums the pressure differences for the second group of cylinders to obtain a second summation in step 96. The fault determination module 72 diagnoses a fault in one of the OCVs 40 and 42 when the difference between the first summation and the second summation exceeds a threshold in step 98. When the first summation is larger than the second summation in step 100, it is determined that the second OCV 42 fails in step 102. Otherwise, it is determined that the first OCV 40 fails in step 104. After the failed OCV 40 or 42 is identified, the control module 60 commands remedial action to prevent further engine damage in step 106. The method 80 ends in step 108.

While the OCV diagnostic system 62 has been described in connection with OCVs associated with the intake valves 20, the OCV diagnostic system 62 can be applied to OCVs associated with the exhaust valves 22 when switchable valve lifters are used to control exhaust valves 22. Moreover, while the valve lifters associated with the first OCV 40 and the second OCV 42 have been described to communicate with the same intake camshaft 28 and cam phaser 38, it is understood and appreciated that the valve lifters associated with the first and second OCVs 40 and 42 may communicate with separate camshafts, cam phasers, and pressure sensors. Therefore, the "cam phaser" recited in the claims may be broadly interpreted to include multiple cam phasers when multiple cam phasers are used to communicate with the OCVs being monitored.

Those skilled in the art can now appreciate from the foregoing description that the broad teachings of the present disclosure can be implemented in a variety of forms. Therefore, while this disclosure has been described in connection with particular examples thereof, the true scope of the disclosure should not be so limited since other modifications will become apparent to the skilled practitioner upon a study of the drawings, the specification and the following claims.

What is claimed is:

1. A diagnostic system comprising:

a first pressure monitoring module that determines low-lift pressures and high-lift pressures in a cam phaser when a first oil control valve (OCV) moves first valve lifters associated with the first OCV to a low-lift state and a high-lift state, respectively;

a second pressure monitoring module that determines the low-lift pressures and the high-lift pressures in the cam phaser when a second OCV moves second valve lifters associated with the second OCV to the low-lift state and the high-lift state, respectively; and a fault determination module that diagnoses a fault in one of the first OCV and the second OCV based the low-lift pressures and the high-lift pressures.

2. The diagnostic system of claim 1 wherein the first OCV communicates with a first group of cylinders and the second OCV communicates with a second group of cylinders.

3. The diagnostic system of claim 2 wherein the fault determination module diagnoses a fault in one of the first OCV and the second OCV based on a comparison between the low-lift and high lift pressures for the first group of cylinders and the low-lift and high-lift pressures for the second group of cylinders.

4. The diagnostic system of claim 1 further comprising a first pressure difference determination module that determines first pressure differences between the low-lift pressures and the high-lift pressures determined by the first pressure monitoring module, and a second pressure difference determination module that determines second pressure differences between the low-lift pressures and the high-lift pressures determined by the second pressure monitoring module.

5. The diagnostic system of claim 4 wherein the first and second pressure differences are determined based on averages of the low-lift pressures and averages of the high-lift pressures.

6. The diagnostic system of claim 4 further comprising a first summation module that determines a first summation of the first pressure differences and a second summation module that determines a second summation of the second pressure differences.

7. The diagnostic system of claim 6 wherein the fault determination module diagnoses a fault in one of the first OCV and the second OCV when a difference between the first summation and the second summation exceeds a threshold.

8. The diagnostic system of claim 6 wherein the fault determination module diagnoses a fault in the first OCV when the first summation is smaller than the second summation.

9. The diagnostic system of claim 6 wherein the fault determination module diagnoses a fault in the first OCV when the first summation is approximately zero.

10. The diagnostic system of claim 1 wherein the low-lift and high-lift pressures are acquired over a predetermined number of engine revolutions and are averaged for each cylinder.

11. The diagnostic system of claim 1 further comprising an enablement module that enables the fault determination module when the engine runs at an engine speed below a predetermined engine speed and the cam phaser is active and operates in a steady state.

12. The diagnostic system of claim 11 wherein the predetermined engine speed is 2000RPM.

13. A method of diagnosing oil control valves (OCVS) comprising:

determining low-lift pressures in a cam phaser when a first oil control valve (OCV) moves first valve lifters to a low-lift state;

determining low-lift pressures in the cam phaser when a second oil control valve (OCV) moves second valve lifters to a low-lift state;

transitioning the first and second valve lifters to a high-lift state;

determining high-lift pressures in the cam phaser when the first valve lifters are in the high-lift state;

determining high-lift pressures in the cam phaser when the second valve lifters are in the high-lift state; and diagnosing a fault in one of the first OCV and the second OCV based on the low-lift pressures and the high-lift pressures in the cam phaser.

14. The method of claim 13 further comprising measuring the low-lift and high-lift pressures in the cam phaser over a predetermined number of engine revolutions and averaging the low-lift and high-lift pressures for each cylinder.

15. The method of claim 13 further comprising determining a plurality of first pressure differences between the high-lift pressures and the low-lift pressures in the cam phaser associated with a first group of cylinders, and a plurality of second pressure differences between the high-lift pressures and the low-lift pressures in the cam phaser associated with a second group of cylinders.

16. The method of claim 15 further comprising determining a first summation of the first pressure differences and a second summation of the second pressure differences.

17. The method of claim 16 further comprising diagnosing a fault in one of the first OCV and the second OCV when a difference between the first summation and the second summation exceeds a threshold.

18. The method of claim 16 further comprising diagnosing a fault in the first OCV when the first summation is smaller than the second summation.

19. The method of claim 16 further comprising diagnosing a fault in the first OCV when the first summation is approximately zero.

* * * * *